US012724444B2

(12) United States Patent
Buduguppa et al.

(10) Patent No.: US 12,724,444 B2
(45) Date of Patent: Sep. 1, 2026

(54) SWITCHED-CAPACITOR FAST START-UP SCHEME FOR BANDGAP CIRCUITS

(71) Applicant: QUALCOMM Incorporated, San Diego, CA (US)

(72) Inventors: Aravind Mahesh Buduguppa, Cork (IE); Przemyslaw Jan Mroszczyk, Cork (IE)

(73) Assignee: QUALCOMM INCORPORATED, San Diego, CA (US)

( * ) Notice: Subject to any disclaimer, the term of this patent is extended or adjusted under 35 U.S.C. 154(b) by 178 days.

(21) Appl. No.: 18/739,907

(22) Filed: Jun. 11, 2024

(65) Prior Publication Data

US 2025/0377682 A1 Dec. 11, 2025

(51) Int. Cl.
*H02M 1/00* (2007.01)
*G05F 3/30* (2006.01)
*H02M 3/07* (2006.01)

(52) U.S. Cl.
CPC ................. *G05F 3/30* (2013.01); *H02M 3/07* (2013.01)

(58) Field of Classification Search
CPC ....... G05F 3/30; H02M 1/0045; H02M 1/007; H02M 1/36; H02M 3/07
See application file for complete search history.

(56) References Cited

U.S. PATENT DOCUMENTS 6,784,652 B1 * 8/2004 Aude ........................ G05F 3/30 323/315
2003/0117120 A1 * 6/2003 Amazeen .................. G05F 3/30 323/313
2007/0096712 A1 * 5/2007 Chang ....................... G05F 3/30 323/313
2008/0224682 A1 * 9/2008 Haiplik ..................... G05F 3/30 327/539
2011/0006749 A1 * 1/2011 Stellberger ................ G05F 3/30 323/313
2016/0209860 A1 * 7/2016 Yen ........................... G05F 3/08
2020/0019203 A1 * 1/2020 Kim ........................ G05F 3/265

FOREIGN PATENT DOCUMENTS

CN 103869868 A * 6/2014
CN 107045370 A * 8/2017 ............. G05F 1/567
CN 105912064 B 2/2018
CN 109725672 A * 5/2019 ............. G05F 3/262

* cited by examiner

*Primary Examiner* — Sisay G Tiku
(74) *Attorney, Agent, or Firm* — Loza & Loza, LLP

(57) ABSTRACT

An apparatus including: a bandgap voltage generating circuit, including: a first current path including a first field effect transistor (FET) coupled in series with a first bipolar junction transistor (BJT) between an upper voltage rail and a lower voltage rail; a second current path including a second FET coupled in series with a resistor and a second BJT between the upper voltage rail and the lower voltage rail; and a third current path including a third FET coupled in series with a set of one or more resistors between the upper voltage rail and the lower voltage rail; a pull-down circuit coupled to gates of the first, second, and third FETs; and a switched-capacitor circuit coupled to the gates of the first, second, and third FETs.

18 Claims, 5 Drawing Sheets

SWITCHED-CAPACITOR FAST START-UP SCHEME FOR BANDGAP CIRCUITS

FIELD

This disclosure relates generally to reference voltage generators, and in particular, to a switched-capacitor fast start-up scheme for bandgap circuits.

BACKGROUND

Bandgap voltage generators are employed in many circuit designs to provide a relatively temperature stable voltage that may be used as a reference by many different circuits. Design considerations for bandgap voltage generators include the temperature-stability of the bandgap voltage, current leakage that may adversely impact the temperature-stability of the bandgap voltage, and the time it takes for the bandgap voltage to settle to a specified settling criteria from the enabling of the bandgap voltage generator.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus, includes: a bandgap voltage generating circuit, including: a first current path including a first field effect transistor (FET) coupled in series with a first bipolar junction transistor (BJT) between an upper voltage rail and a lower voltage rail; a second current path including a second FET coupled in series with a resistor and a second BJT between the upper voltage rail and the lower voltage rail; and a third current path including a third FET coupled in series with a set of one or more resistors between the upper voltage rail and the lower voltage rail; a pull-down circuit coupled to gates of the first, second, and third FETs; and a switched-capacitor circuit coupled to the gates of the first, second, and third FETs.

Another aspect of the disclosure relates to an apparatus. The apparatus, includes: a bandgap voltage generating circuit having a plurality of current paths, each current path comprising a field effect transistor (FET), and gates of the FETs of the plurality of current paths coupled together; a pull-down start-up circuit coupled to the gates of the FETs of the plurality of current paths of the bandgap voltage generating circuit, the pull-down start-up circuit comprising a pull-down transistor configured to pull down voltages at the gates of the FETs upon start-up of the bandgap voltage generating circuit; and a secondary start-up circuit comprising a switched-capacitor circuit coupled to the gates of the plurality of FETs of the plurality of current paths of the bandgap voltage generating circuit, the switched-capacitor circuit configured to draw additional current from the gates of the FETs upon the start-up of the bandgap voltage generating circuit.

Another aspect of the disclosure relates to a method. The method, includes: charging a capacitor in response to disabling a bandgap voltage generating circuit; and enabling a bandgap voltage generating circuit, including: pulling down voltages at gates of a set of field effect transistors (FETs), and further charging the capacitor to draw additional current from the gates of the set of FETs.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

BRIEF DESCRIPTION OF THE DRAWINGS

FIG. 4 illustrates a block diagram of an example bandgap voltage generator in accordance with another aspect of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. The term "substantially" means that the associated parameter may not be exact as indicated but accounts for some variation due to specified tolerances.

Figure 1:
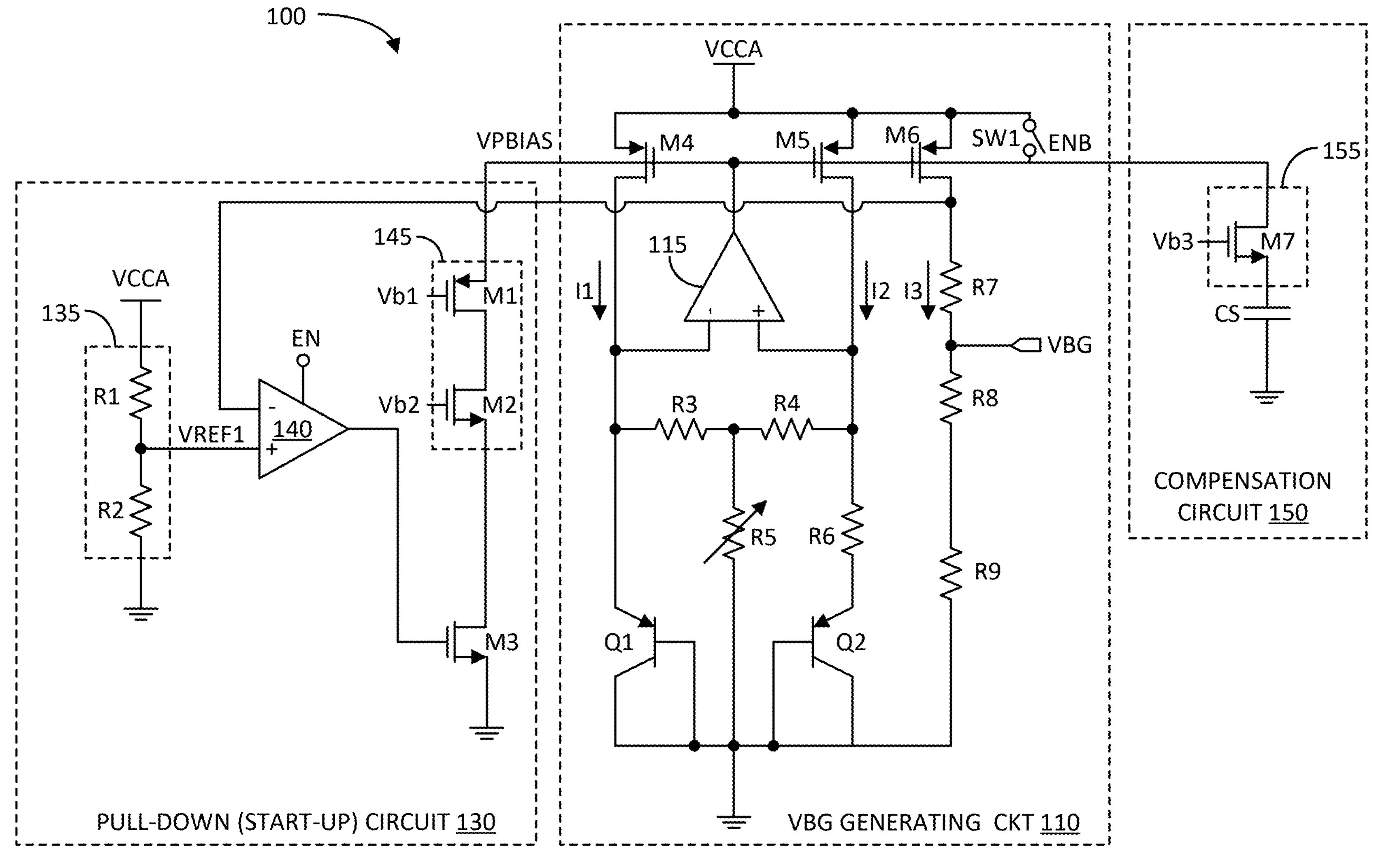
FIG. 1 illustrates a block diagram of an example bandgap voltage generator in accordance with an aspect of the disclosure.

FIG. 1 illustrates a block diagram of an example bandgap voltage generator 100 in accordance with an aspect of the disclosure. The bandgap voltage generator 100 includes a bandgap voltage (VBG) generating circuit 110, a pull-down (start-up) circuit 130, and a compensation circuit 150.

The VBG generating circuit 110 is configured to generate a bandgap voltage (VBG) which is substantially stable with respect to temperature changes. In this example, the VBG generating circuit 110 has a first current path including a first field effect transistor (FET) M4 (e.g., a p-channel metal oxide semiconductor field effect transistor (PMOS FET)) coupled in series with a first bipolar junction transistor (BJT) Q1 between an upper voltage rail VCCA and a lower voltage rail (e.g., ground). So as to coincide with the ground symbol shown in FIG. 1, the lower voltage rail may be referred to hereinafter as "ground," although it may have a different potential than ground. The source of the first FET M4 is coupled to the upper voltage rail VCCA, and the drain of the first FET M4 is coupled to the emitter of the first BJT Q1. The first BJT Q1 includes a base and a collector coupled to ground.

The VBG generating circuit 110 further includes a second current path including a FET M5 (e.g., a PMOS FET) coupled in series with a resistor R6 and a second BJT Q2 between the upper voltage rail VCCA and ground. That is, the source of the second FET M5 is coupled to the upper voltage rail VCCA, and the drain of the second FET M5 is coupled to a first end of the resistor R6. The second BJT Q2 includes an emitter coupled to a second end of resistor R6, and a base and a collector both coupled to ground.

Additionally, the VBG generating circuit 110 further includes a third current path including a third FET M6 (e.g., a PMOS FET) coupled in series with a set of one or more resistors R7, R8, and R9 between the upper voltage rail VCCA and ground. That is, the third FET M6 includes a source coupled to the upper voltage rail VCCA and a drain coupled to the resistor R7. The FETs M4, M5, and M6 include gates coupled together.

To effectuate bandgap currents I1, I2, and I3 (or I1-I3) via the first, second, and third current paths, respectively, the BJT Q2 may be sized larger than the BJT Q1. For example, the size ratio between BJT Q2 and BJT Q1 may be ten-to-one (e.g., 10:1) or other. The VBG generating circuit 110 includes an operational amplifier 115 for controlling the bandgap currents I1-I3 via the first, second, and third current paths. In particular, the operational amplifier 115 includes a first (e.g., negative) input coupled to a node between the drain of FET M4 and the emitter of BJT Q1. The operational amplifier 115 further includes a second (e.g., positive) input coupled to a node between the drain of FET M5 and the emitter of BJT Q2. The operational amplifier 115 includes an output coupled to the gates of FETs M4, M5, and M6 (collectively referred to herein as FETs M4-M6).

Additionally, the VBG generating circuit 110 includes resistors R3 and R4 coupled in series between the first (e.g., negative) and second (e.g., positive) inputs of the operational amplifier 115. Further, the VBG generating circuit 110 includes a resistor R5, which may have a variable or controllable resistance, coupled between a node between resistors R3 and R4, and ground.

The VBG generating circuit 110 includes a first switching device SW1 coupled between the upper voltage rail VCCA and the gates of FETs M4-M6 for enabling/disabling the VBG generating circuit 110. For example, when the first switching device SW1 is turned on or closed in response to an asserted enable-bar signal ENB (e.g., ENB=1, or a deasserted enable signal EN=1), the switching device SW1 couples the upper voltage rail VCCA to the gates of FETs M4-M6; thereby, operationally turning off the FETs M4-M6 and disabling the first, second, and third current paths of the VBG generating circuit 110.

When the switching device SW1 is turned off or open in response to a deasserted enable-bar signal ENB (e.g., ENB=0, or an asserted enable signal EN=1), the switching device SW1 allows the FETs M4-M6 to be operational and initiated by the pull-down (start-up) circuit 130 to produce bandgap currents I1-I3 via the first, second, and third current paths M4-Q1, M5-Q2, and M6-R6-R7-R8 to generate a bandgap voltage (VBG) at a node between resistors R6 and R7.

The pull-down circuit 130 is configured to pull-down the gates of FETs M4, M5, and M6 to enable the first, second, and third current paths of the VBG generating circuit 110. The pull-down circuit 130 includes a first reference voltage generator 135 including a pair of resistors R1 and R2 coupled between the upper voltage rail VCCA and ground. The pair of resistors R1 and R2 operate as a voltage divider to generate a first reference voltage VREF1 at a node between the resistors R1 and R2.

The pull-down circuit 130 further includes a comparator 140 (e.g., a continuous-time comparator) including a first (e.g., negative) input coupled to a source of FET M6, and a second (e.g., positive) input coupled to the node between resistors R1 and R2 to receive the first reference voltage VREF1. The comparator 140 includes an output coupled to a gate of a pull-down FET M3 (e.g., an n-channel metal oxide semiconductor FET or NMOS FET). The comparator 140 may be enabled/disabled based on an enable signal EN. As discussed further herein, the FET M3 may be implemented with a set of stacked FETs.

Additionally, the comparator 140 may include a protection circuit 145 for the pull-down FET M3, including protection FETs M1 (e.g., PMOS FET) and M2 (e.g., NMOS FET) coupled in series with the pull-down FET M3 between the gates of FETs M4-M6 and ground. That is, the FET M1 includes a source coupled to the gates of FETs M4-M6, a gate configured to receive a first bias voltage Vb1 (e.g., 0.5 Volt (V), where VCCA=1.2V), and a drain coupled to a drain of FET M2. The FET M2, in turn, includes a gate configured to receive a second bias voltage Vb2 (e.g., 0.7V, where VCCA=1.2V), and a source coupled to a drain of pull-down FET M3. The pull-down FET M3 includes a source coupled to ground.

The pull-down circuit 130 operates as follows: through negative feedback operation, the comparator 140 outputs a gate voltage for the pull-down FET M3 to cause the FET M3 to conduct and pull down the gate voltages of FETs M4-M6 to bias voltage VPBIAS. As previously discussed, the pulling down of the gates voltages of FETs M4-M6 initiates the bandgap currents I1-I3 via the first, second, and third current paths M4-Q1, M5-Q2, and M6-R6-R7-R8, respectively. The pull-down operation occurs until the voltage at the source of FET M6 is substantially equal to the first reference voltage VREF1.

Accordingly, the first reference voltage VREF1 may be set to the expected operational source voltage of the FET M6. The optional protection circuit 145 generates a voltage drop across FETs M1 and M2 to prevent an overvoltage (e.g., a voltage beyond the reliability limit) of the pull-down FET M3.

The compensation circuit 150 includes a compensation capacitor CS that creates a dominant pole to control or improve the phase margin of the operational amplifier 115. In particular, the compensation circuit 150 includes a protection FET M7 (e.g., NMOS FET) coupled in series with the compensation capacitor CS between the gates of FETs M4-M6 and ground. That is, the protection FET M7 includes a drain coupled to the gates of FETs M4-M6, and a gate configured to receive a bias voltage (e.g., 0.7V, where VCCA=1.2V). The compensation capacitor CS is coupled between the source of FET M7 and ground. The protection FET M7 protects the compensation capacitor CS from overvoltage (e.g., a voltage that exceeds a reliability limit of the compensation capacitor CS).

An issue with the bandgap voltage generator 100 is that current leakage via the pull-down FET M3 negatively affects the temperature stability of the bandgap voltage VBG. To reduce such current leakage, the pull-down FET M3 may be implemented with a set of stacked FETs to increase its overall resistance; and thereby, lower the current leakage. Additionally, the width of one or more metal traces coupled to the drain and source of the pull-down FET M3 may be narrowed to further increase the overall resistance associated with the pull-down FET M3; and thereby, reduce the current leakage.

A negative consequence of increasing the resistance of the pull-down FET M3 is that the time it takes for the bandgap voltage (VBG) to settle to a specified settling criteria from the enabling of the VBG generating circuit 110 ("settling time") is relatively large due to the added resistance associated with the pull-down FET M3. Accordingly, there is a need to reduce the settling time of the bandgap voltage VBG from the enabling of the VBG generating circuit 110, while maintaining the current leakage of the pull-down FET M3 relatively small through the use of stacked FETs and/or associated narrow metal traces so as not to significantly impact the temperature stability of the bandgap voltage VBG.

Figure 2:
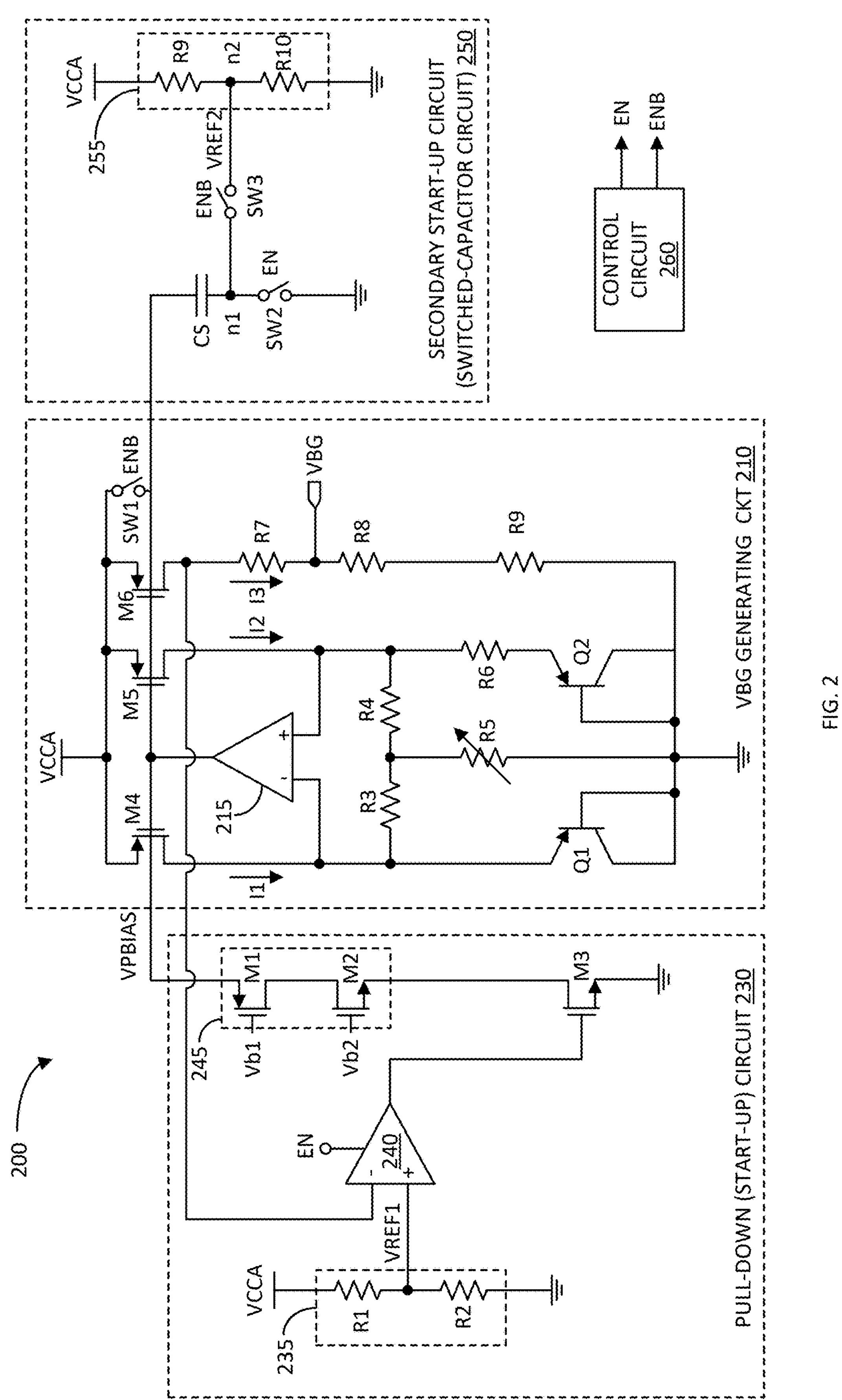
FIG. 2 illustrates a block diagram of another example bandgap reference voltage generator in accordance with an aspect of the disclosure.

FIG. 2 illustrates a block diagram of another example bandgap reference voltage generator 200 in accordance with another aspect of the disclosure. The bandgap reference voltage generator 200 is a variation of the bandgap reference voltage generator 100, and includes many of the same/similar elements as indicated by the same identifiers, and reference numbers with the exception that their most significant digit is a "2" in the case of bandgap reference voltage generator 200 as opposed to a "1" in the case of bandgap reference voltage generator 100. The bandgap reference voltage generator 200 differs from bandgap reference voltage generator 100 in that the compensation circuit 150 has been replaced with a secondary start-up circuit including a switched-capacitor circuit 250.

In summary, the switched-capacitor circuit 250 includes a compensation capacitor CS, which creates a dominant pole to control or improve the phase margin of the operational amplifier 215 when the VBG generating circuit 210 is enabled (e.g., during normal operation of the VBG generating circuit 210). The switched-capacitor circuit 250 also uses the compensation capacitor CS to draw additional current from the gates of the FETs M4-M6 to reduce the settling time of the bandgap voltage VBG upon the enabling or start-up of the VBG generating circuit 210. Additionally, the switched-capacitor circuit 250 also eliminates the need for a protection device or FET (e.g., FET M7 in FIG. 1) to protect the compensation capacitor CS as the maximum voltage across the compensation capacitor CS is less than the supply voltage at the upper voltage rail VCCA.

More specifically, the switched-capacitor circuit 250 includes a compensation capacitor CS coupled in series with a second switching device SW2 between the gates of FETs M4-M6 and the lower voltage rail (e.g., ground). Additionally, the switched-capacitor circuit 250 includes a second reference voltage generator 255 configured to generate a second reference voltage VREF2. In particular, the second reference voltage generator 255 includes a voltage divider including resistors R9 and R10 coupled in series between the upper voltage rail VCCA and ground, and configured to generate the second reference voltage VREF2 at an output node n2 between the resistors R9 and R10. Further, the switched-capacitor circuit 250 includes a third switching device SW3 coupled between a node n1 between the compensation capacitor CS and the second switching device SW2 and the output node n2 of the second reference voltage generator 255. The states of the first, second, and third switching devices SW1, SW2, and SW3 may be controlled by enable signals ENB, EN, and ENB, respectively. The enable signals ENB and EN, which are complementary signals, may be generated by a control circuit 260. Any of the switching devices SW1, SW2, and SW3 may be implemented as a PMOS FET, an NMOS FET, a pass gate, a transmission gate, or other type of switching device. In such implementation, the enable signals ENB, EN, and ENB may be provided to the control terminals or gate of the switching devices SW1, SW2, and SW3.

Figure 3A:
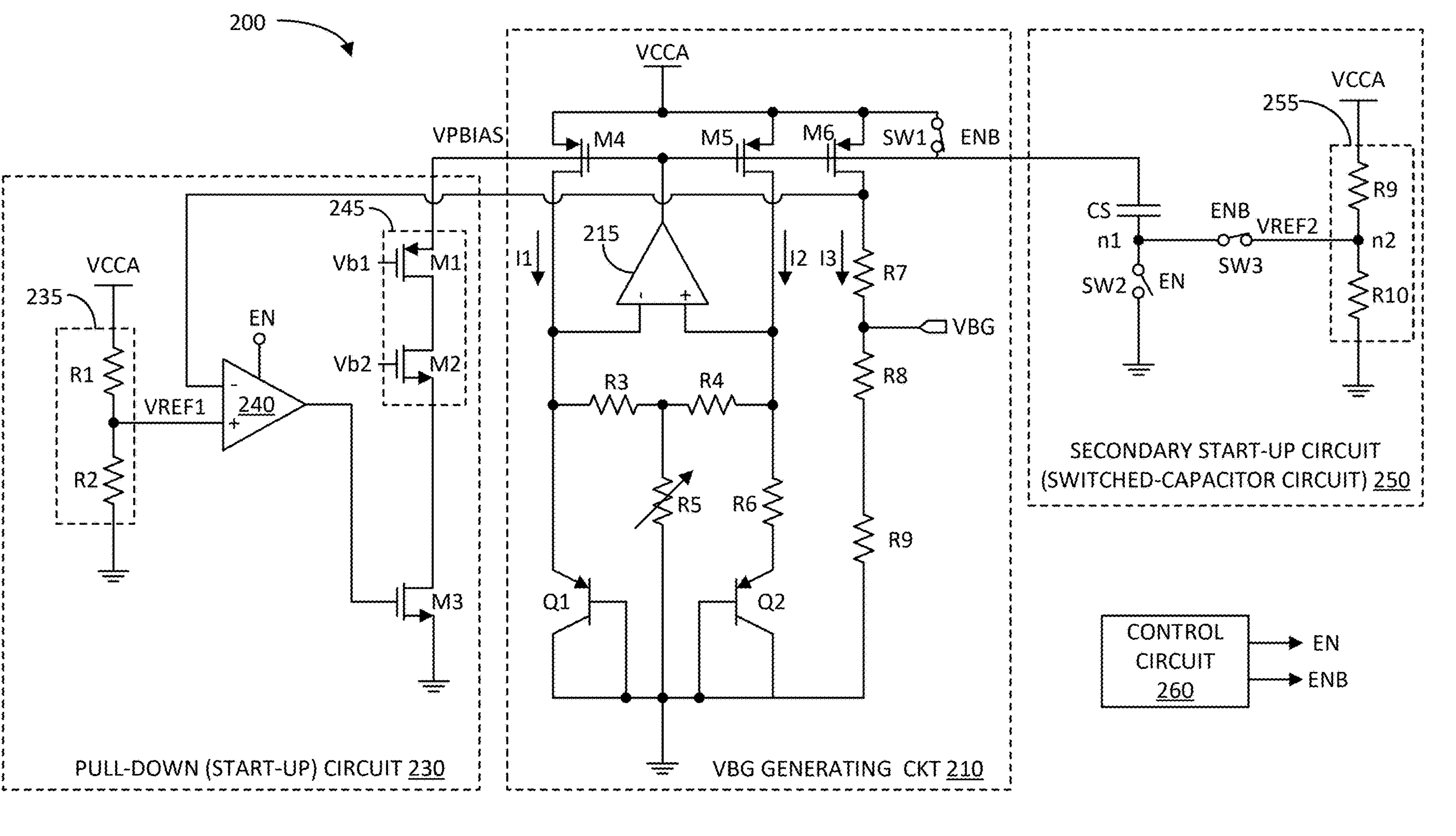
FIG. 3A illustrates a block diagram of the example bandgap voltage generator of FIG. 2 in a disabled configuration in accordance with an aspect of the disclosure.

FIG. 3A illustrates a block diagram of the example bandgap voltage generator 200 in a disabled configuration in accordance with an aspect of the disclosure. In the disabled configuration, the control circuit 260 generates a deasserted enable signal (EN=0) and an asserted enable-bar signal (ENB=1). The asserted enable-bar signal (ENB=1) turns on or closes the first and third switching devices SW1 and SW3, and the deasserted enable signal (EN=0) turns off or opens the second switching device SW2 and disables the comparator 240. In this configuration, the compensation capacitor CS is coupled across the upper voltage rail VCCA and the output node n2 of the second reference voltage generator 255. Accordingly, the compensation capacitor CS is partially charged to a voltage substantially equal to the supply voltage at the upper voltage rail VCCA (also referred to herein as VCCA) minus the second reference voltage VREF2 (e.g., VCCA-VREF2).

Figure 3B:
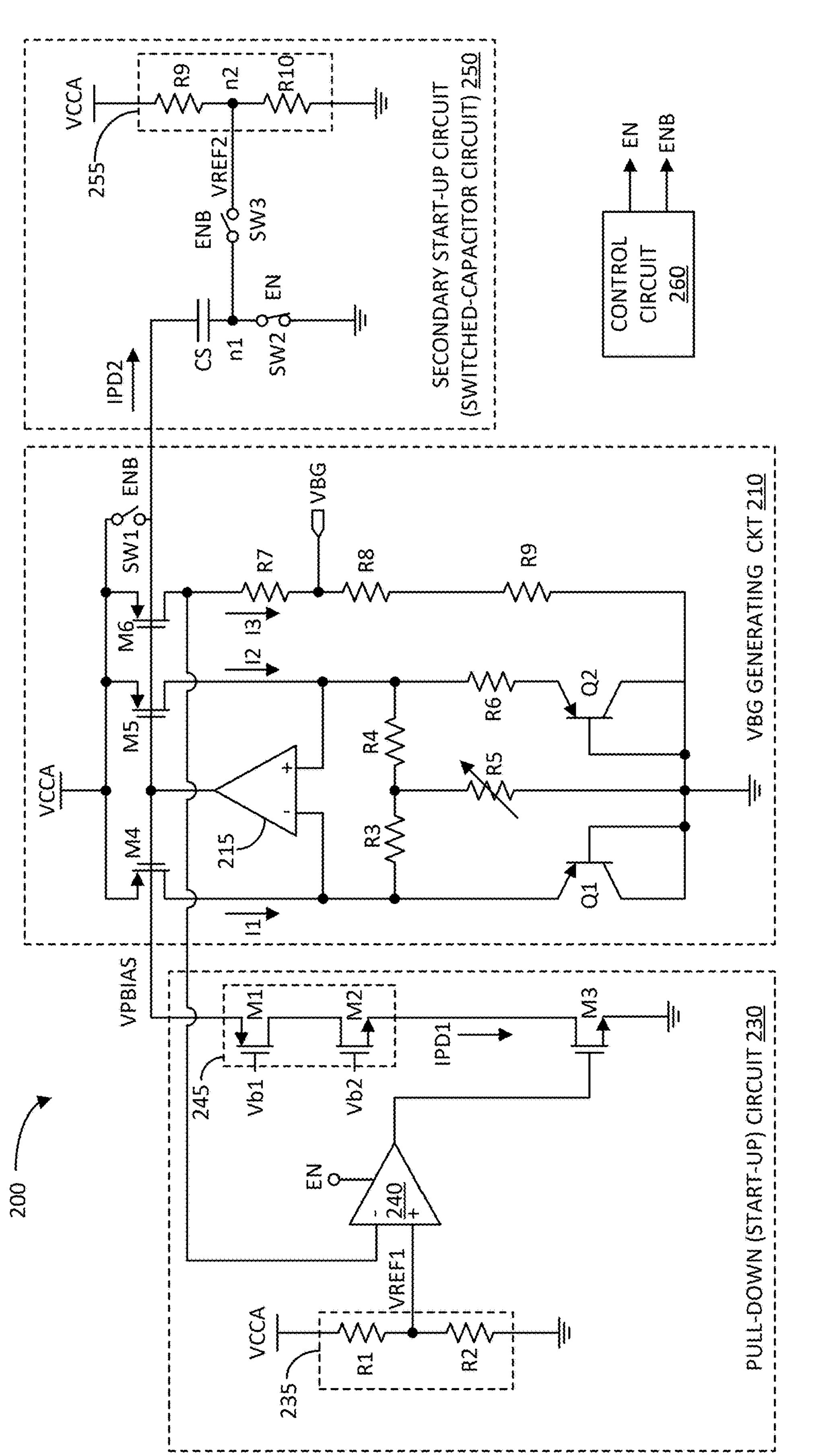
FIG. 3B illustrates a block diagram of the example bandgap voltage generator of FIG. 2 in an enabled configuration in accordance with an aspect of the disclosure.

FIG. 3B illustrates a block diagram of the example bandgap voltage generator 200 in an enabled configuration in accordance with an aspect of the disclosure. In the enabled configuration, the control circuit 260 generates an asserted enable signal (EN=1) and a deasserted enable-bar signal (ENB=0). The asserted enable signal (EN=1) turns on or closes the second switching device SW2 and enables the comparator 240, and the deasserted enable-bar signal (ENB=0) turns off or opens the first and third switching devices SW1 and SW3. In this configuration, the compensation capacitor CS is coupled between the gates of FETs M4-M6 and ground. Accordingly, the compensation capacitor CS is further charged to a voltage substantially equal to the gate bias voltage VPBIAS of FETs M4-M6 minus the potential at the lower voltage rail (e.g., ground=0V). To ensure the further charging of the compensation capacitor CS, the second reference voltage VREF2 may be selected in accordance with the following relationship: VPBIAS-0V>VCCA-VREF2 in the case the lower voltage rail is at ground potential. The further charging of the compensation capacitor CS draws additional current IPD2 from the gates of the FETs M4-M6 to reduce the settling time of the bandgap voltage VGS upon the enabling or start-up of the bandgap voltage generator 200.

As previously mentioned, in the enabled configuration of the bandgap voltage generator 200, the compensation capacitor CS is coupled between the gates of FETs M4-M6 and ground. This is the same configuration of the compensation capacitor CS in the bandgap voltage generator 100. Accordingly, the compensation capacitor CS is configured to create a dominant pole to control or improve the phase margin of the operational amplifier 215. Further, as the stacking of the pull-down FET M3 is not affected by the switched-capacitor circuit 250 and the compensation capacitor CS does not introduce another current leakage path, the switched-capacitor circuit 230 should not adversely affect the temperature stability of the bandgap voltage VBG.

FIG. 4 illustrates a block diagram of an example bandgap voltage generator 400 in accordance with another aspect of the disclosure. The bandgap voltage generator 400 includes a bandgap voltage generating circuit 410, including: a first bandgap current path (I1) including a first field effect transistor (FET) (M4) coupled in series with a first bipolar junction transistor (BJT) Q1 between an upper voltage rail VCCA and a lower voltage rail VSS; a second bandgap current path (I2) including a second FET M5 coupled in series with a resistor R1 and a second BJT Q2 between the upper voltage rail VCCA and the lower voltage rail VSS; and a third bandgap current path (I3) including a third FET M6 coupled in series with a set of one or more resistors R2 between the upper voltage rail VCCA and the lower voltage rail VSS. Although a particular example of a bandgap voltage generating circuit 110/210 has been described, it shall be understood that the bandgap voltage generating circuit 410 may take on different implementations. For example, the example bandgap voltage generating circuit 110/210 used p-n-p type BJTs, but another implementation may use n-p-n type BJTs. In the n-p-n version of a bandgap voltage generating circuit, the collector and base may be coupled together, and the emitter may be coupled to the lower voltage rail, for both BJTs Q1 and Q2.

The bandgap voltage generator 400 further includes a pull-down circuit 430 coupled to gates of the first, second, and third FETs M4-M6 of the bandgap voltage generating circuit 410. Although a particular example of a pull-down circuit 130/230 has been described, it shall be understood that the pull-down circuit 430 may take on different implementations. Additionally, the bandgap voltage generator 400 includes a switched-capacitor circuit 440 coupled to the gates of the first, second, and third FETs M4-M6 of the bandgap voltage generating circuit 410. Although a particular example of switched-capacitor circuit 250 has been described, it shall be understood that the switched-capacitor circuit may take on different implementations.

Figure 5:
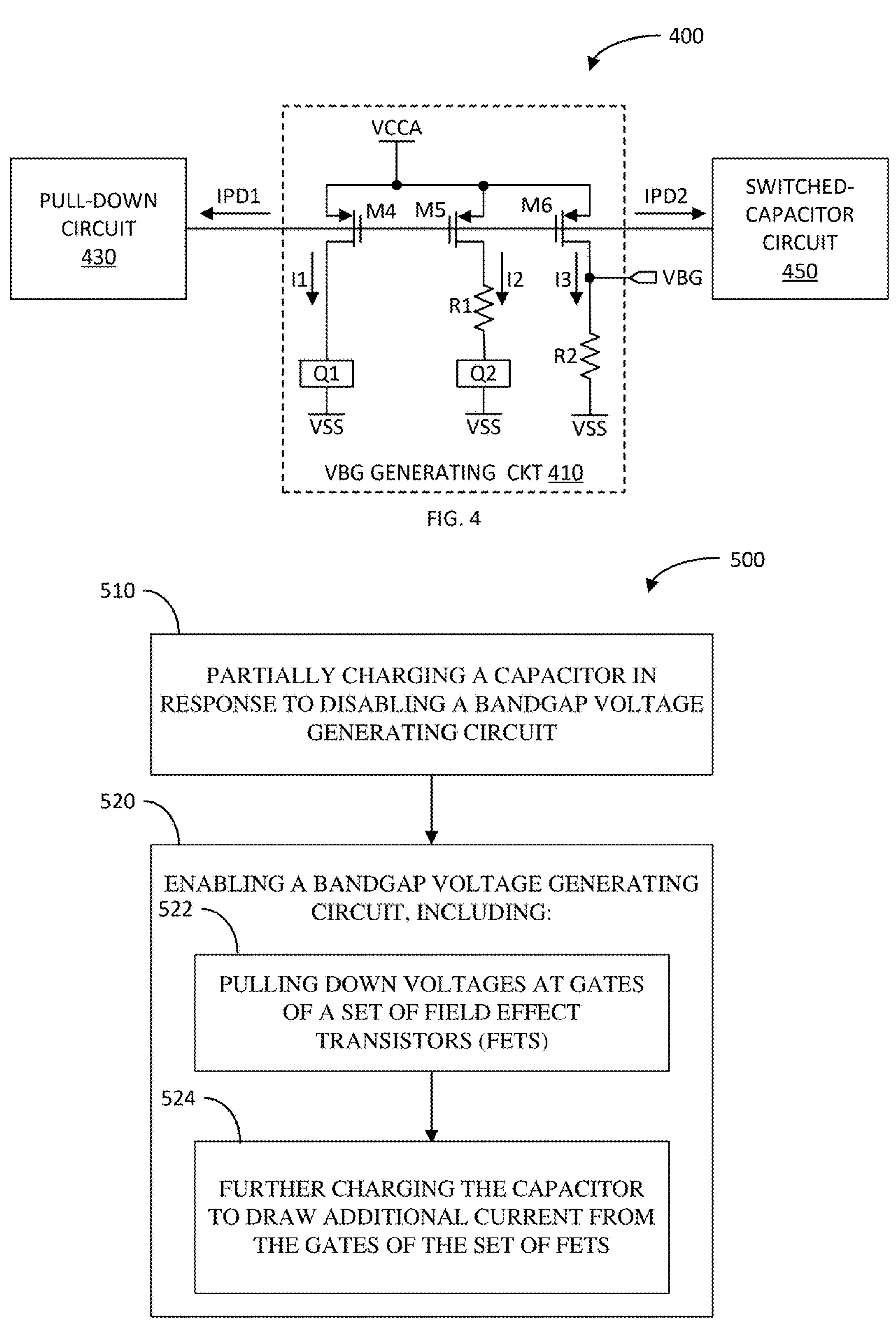
FIG. 5 illustrates a flow diagram of an example method of enabling a bandgap voltage generator in accordance with another aspect of the disclosure.

FIG. 5 illustrates a flow diagram of an example method 500 of enabling a bandgap voltage generator in accordance with another aspect of the disclosure. The method 500 includes partially charging a capacitor in response to disabling a bandgap voltage generating circuit (block 510). An example of means for partially charging a capacitor in response to disabling a bandgap voltage generating circuit includes the upper voltage rail VCCA, the first and third switching device SW1 and SW3, and the second reference voltage generator 255.

The method 500 further including enabling a bandgap voltage generating circuit (520), including pulling down voltages at gates of a set of field effect transistors (FETs) (sub-block 522), and further charging the capacitor to draw additional current from the gates of the set of FETs (sub-block 524). An example of a means for pulling down voltages at gates of a set of field effect transistors (FETs) include the pull-down (start-up) circuit 130/230, and an example of means for further charging the capacitor to draw additional current from the gates of the set of FETs include the first and second switching devices SW1 and SW2.

Partially charging of the capacitor in response to disabling the bandgap voltage generating circuit in accordance with the method 500 may include coupling a first voltage rail and a reference voltage generator to opposite ends of the capacitor, respectively. Example of means for coupling a first voltage rail and a reference voltage generator to opposite ends of the capacitor, respectively, include the first and third switching devices SW1 and SW3.

The further charging of the capacitor to draw additional current from the gates of the set of FETs in accordance with the method 500 may include decoupling the capacitor from the first voltage rail and the reference voltage generator, and coupling the capacitor between the gates of the set of FETs and a second voltage rail. An example of means for decoupling the capacitor from the first voltage rail and the reference voltage generator include the first and third switching device SW1 and SW3. An example of means for coupling the capacitor between the gates of the set of FETs and a second voltage rail include the first and second switching device SW2.

The method 500 may further include disabling the bandgap voltage generating circuit including coupling a voltage rail to the gates of the set of FETs. An example of means for disabling the bandgap voltage generating circuit including means for coupling a voltage rail to the gates of the set of FETs include the first switching device SW1.

The following provides an overview of aspects of the present disclosure:

Aspect 1: An apparatus, comprising: a bandgap voltage generating circuit, including: a first current path including a first field effect transistor (FET) coupled in series with a first bipolar junction transistor (BJT) between an upper voltage rail and a lower voltage rail; a second current path including a second FET coupled in series with a resistor and a second BJT between the upper voltage rail and the lower voltage rail; and a third current path including a third FET coupled in series with a set of one or more resistors between the upper voltage rail and the lower voltage rail; a pull-down circuit coupled to gates of the first, second, and third FETs; and a switched-capacitor circuit coupled to the gates of the first, second, and third FETs.

Aspect 2: The apparatus of aspect 1, wherein the bandgap voltage generating circuit comprises a first switching device coupled between the upper voltage rail and the gates of the first, second, and third FETs.

Aspect 3: The apparatus of aspect 2, wherein the switched-capacitor circuit comprises: a second switching device; a capacitor coupled in series with the second switching device between the gates of the first, second, and third FETs and the lower voltage rail; a reference voltage generator; and a third switching device coupled between the capacitor and the reference voltage generator.

Aspect 4: The apparatus of aspect 3, further comprising a control circuit coupled to the first, second, and third switching devices.

Aspect 5: The apparatus of aspect 4, wherein the control circuit is configured to: close the first and third switching devices, and open the second switching device in response to a deasserted enable signal; and open the first and third switching devices, and close the second switching device in response to an enable signal.

Aspect 6: The apparatus of any one of aspects 3-5, wherein the reference voltage generator comprises a voltage divider.

Aspect 7: The apparatus of any one of aspects 1-6, wherein: the first and second BJTs include bases coupled to the lower voltage rail; the bandgap voltage generating circuit comprises an operational amplifier including a first input coupled to a first node between the first FET and the first BJT, a second input coupled to a second node between the second FET and the second BJT, and a third node coupled to gates of the first, second, and third FETs; a pair of resistors coupled across the first and second inputs of the operational amplifier; and an additional resistor coupled to a node between the pair of resistors and the lower voltage rail.

Aspect 8: The apparatus of any one of aspects 1-7, wherein the pull-down circuit, comprises: a reference voltage generator; a comparator including a first input coupled to the reference voltage generator, and a second input coupled to a source of the third FET; and a pull-down field effect transistor (FET) coupled between the gates of first, second, and third FETs and the lower voltage rail, wherein the pull-down FET includes a gate coupled to an output of the comparator.

Aspect 9: The apparatus of aspect 8, wherein the pull-down circuit comprises one or more protection field effect transistors (FETs) coupled between the gates of the first, second, and third FETs and the pull-down FET.

Aspect 10: An apparatus, comprising: a bandgap voltage generating circuit having a plurality of current paths, each current path comprising a field effect transistor (FET), and gates of the FETs of the plurality of current paths coupled together; a pull-down start-up circuit coupled to the gates of the FETs of the plurality of current paths of the bandgap voltage generating circuit, the pull-down start-up circuit comprising a pull-down transistor configured to pull down voltages at the gates of the FETs upon start-up of the bandgap voltage generating circuit; and a secondary start-up circuit comprising a switched-capacitor circuit coupled to the gates of the plurality of FETs of the plurality of current paths of the bandgap voltage generating circuit, the switched-capacitor circuit configured to draw additional current from the gates of the FETs upon the start-up of the bandgap voltage generating circuit.

Aspect 11: The apparatus of aspect 10, wherein the bandgap voltage generating circuit comprises a first switching device coupled between an upper voltage rail and the gates of the FETs, wherein the first switching device is configured to close in response to the deasserted enable signal, and open in response to the asserted enable signal.

Aspect 12: The apparatus of aspect 11, wherein the switched-capacitor circuit comprises: a reference voltage generator configured to generate reference voltage; a capacitor; a second switching device coupled in series with the capacitor between the gates of the FETs and the lower voltage rail; and a third switching device coupled between the capacitor and the reference voltage generator.

Aspect 13: The apparatus of aspect 12, wherein the first and third switching devices are configured to close and the second switching device is configured to open in response to the deasserted enable signal to couple the upper voltage rail and the reference voltage generator to both ends of the capacitor, respectively, wherein the capacitor is charged to a first voltage related to a difference of a supply voltage at the upper voltage rail and the reference voltage.

Aspect 14: The apparatus of aspect 12 or 13, wherein the first and third switching devices are configured to open and the second switching device is configured to close in response to the asserted enable signal to couple the capacitor between the gates of the FETs and the lower voltage rail, wherein capacitor is further charged to a second voltage related to difference of the voltages at the gates of the FETs and a potential at the lower voltage rail.

Aspect 15: The apparatus of any one of aspects 12-14, wherein the reference voltage generator comprises a voltage divider.

Aspect 16: A method, comprising: charging a capacitor in response to disabling a bandgap voltage generating circuit; and enabling a bandgap voltage generating circuit, comprising: pulling down voltages at gates of a set of field effect transistors (FETs); and further charging the capacitor to draw additional current from the gates of the set of FETs.

Aspect 17: The method of aspect 16, wherein charging the capacitor in response to disabling the bandgap voltage generating circuit, comprises coupling a first voltage rail and a reference voltage generator to opposite ends of the capacitor, respectively.

Aspect 18: The method of aspect 17, wherein further charging the capacitor to draw the additional current from the gates of the set of FETs, comprises: decoupling the capacitor from the first voltage rail and the reference voltage generator; and coupling the capacitor between the gates of the set of FETs and a second voltage rail.

Aspect 19: The method of any one of aspects 16-18, wherein pulling down the voltages at the gates of the set of FETs comprises coupling the gates of the set of FETs to a voltage rail via a pull-down FET.

Aspect 20: The method of any one of aspects 16-18, further comprising disabling the bandgap voltage generating circuit including coupling a voltage rail to the gates of the set of FETs.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:

a bandgap voltage generating circuit, comprising:

a first current path including a first field effect transistor (FET) coupled in series with a first bipolar junction transistor (BJT) between an upper voltage rail and a lower voltage rail, a second current path including a second FET coupled in series with a resistor and a second BJT between the upper voltage rail and the lower voltage rail, a third current path including a third FET coupled in series with a set of one or more resistors between the upper voltage rail and the lower voltage rail, and a first switching device coupled between the upper voltage rail and the gates of the first, second, and third FETs;

a pull-down circuit coupled to gates of the first, second, and third FETs; and a switched-capacitor circuit coupled to the gates of the first, second, and third FETs.

2. The apparatus of claim 1, wherein the switched-capacitor circuit comprises:

a second switching device;

a capacitor coupled in series with the second switching device between the gates of the first, second, and third FETs and the lower voltage rail;

a reference voltage generator; and a third switching device coupled between the capacitor and the reference voltage generator.

3. The apparatus of claim 2, further comprising a control circuit coupled to the first, second, and third switching devices.

4. The apparatus of claim 3, wherein the control circuit is configured to:

close the first and third switching devices, and open the second switching device in response to a deasserted enable signal; and open the first and third switching devices, and close the second switching device in response to an enable signal.

5. The apparatus of claim 2, wherein the reference voltage generator comprises a voltage divider.

6. The apparatus of claim 1, wherein:

the first and second BJTs include bases coupled to the lower voltage rail;

the bandgap voltage generating circuit comprises an operational amplifier including a first input coupled to a first node between the first FET and the first BJT, a second input coupled to a second node between the second FET and the second BJT, and a third node coupled to the gates of the first, second, and third FETs;

a pair of resistors coupled across the first and second inputs of the operational amplifier; and an additional resistor coupled to a node between the pair of resistors and the lower voltage rail.

7. The apparatus of claim 1, wherein the pull-down circuit, comprises:

a reference voltage generator;

a comparator including a first input coupled to the reference voltage generator, and a second input coupled to a source of the third FET; and a pull-down field effect transistor (FET) coupled between the gates of first, second, and third FETs and the lower voltage rail, wherein the pull-down FET includes a gate coupled to an output of the comparator.

8. The apparatus of claim 1, wherein the pull-down circuit comprises one or more protection field effect transistors (FETs) coupled between the gates of the first, second, and third FETs and the pull-down FET.

9. An apparatus, comprising:

a bandgap voltage generating circuit having a plurality of current paths, each current path comprising a field effect transistor (FET), and gates of the FETs of the plurality of current paths coupled together, wherein the bandgap voltage generating circuit comprises a first switching device coupled between an upper voltage rail and the gates of the FETs, wherein the first switching device is configured to close in response to an enable signal being deasserted, and open in response to the enable signal being asserted;

a pull-down start-up circuit coupled to the gates of the FETs of the plurality of current paths of the bandgap voltage generating circuit, the pull-down start-up circuit comprising a pull-down transistor configured to pull down voltages at the gates of the FETs upon start-up of the bandgap voltage generating circuit; and a secondary start-up circuit comprising a switched-capacitor circuit coupled to the gates of the plurality of FETs of the plurality of current paths of the bandgap voltage generating circuit, the switched-capacitor circuit configured to draw additional current from the gates of the FETs upon the start-up of the bandgap voltage generating circuit.

10. The apparatus of claim 9, wherein the switched-capacitor circuit comprises:

a reference voltage generator configured to generate reference voltage;

a capacitor;

a second switching device coupled in series with the capacitor between the gates of the FETs and a lower voltage rail; and a third switching device coupled between the capacitor and the reference voltage generator.

11. The apparatus of claim 10, wherein the first and third switching devices are configured to close and the second switching device is configured to open in response to the deasserted enable signal to couple the upper voltage rail and the reference voltage generator to both ends of the capacitor, respectively, wherein the capacitor is charged to a first voltage related to a difference between a supply voltage at the upper voltage rail and the reference voltage.

12. The apparatus of claim 10, wherein the first and third switching devices are configured to open and the second switching device is configured to close in response to the asserted enable signal to couple the capacitor between the gates of the FETs and the lower voltage rail, wherein the capacitor is further charged to a second voltage related to a difference of the voltages at the gates of the FETs and a potential at the lower voltage rail.

13. The apparatus of claim 10, wherein the reference voltage generator comprises a voltage divider.

14. A method, comprising:

partially charging a capacitor in response to disabling a bandgap voltage generating circuit; and enabling the bandgap voltage generating circuit comprising:

pulling down voltages at gates of a set of field effect transistors (FETs); and further charging the capacitor to draw additional current from the gates of the set of FETs.

15. The method of claim 14, wherein partially charging the capacitor in response to disabling the bandgap voltage generating circuit, comprises coupling a first voltage rail and a reference voltage generator to opposite ends of the capacitor, respectively.

16. The method of claim 15, wherein further charging the capacitor to draw the additional current from the gates of the set of FETs, comprises:

decoupling the capacitor from the first voltage rail and the reference voltage generator; and coupling the capacitor between the gates of the set of FETs and a second voltage rail.

17. The method of claim 14, wherein pulling down the voltages at the gates of the set of FETs comprises coupling the gates of the set of FETs to a voltage rail via a pull-down FET.

18. The method of claim 14, further comprising disabling the bandgap voltage generating circuit including coupling a voltage rail to the gates of the set of FETs.

* * * * *